US010160608B2

(12) United States Patent
Nishizaka et al.

(10) Patent No.: US 10,160,608 B2
(45) Date of Patent: Dec. 25, 2018

(54) ROBOT SYSTEM AND METHOD FOR PICKING WORKPIECE

(71) Applicant: KABUSHIKI KAISHA YASKAWA DENKI, Kitakyushu-shi (JP)

(72) Inventors: Yoshitaka Nishizaka, Kitakyushu (JP); Ken Nakamura, Kitakyushu (JP); Tomoki Kawano, Kitakyushu (JP); Yutaro Uchida, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 82 days.

(21) Appl. No.: 14/857,763

(22) Filed: Sep. 17, 2015

(65) Prior Publication Data

US 2016/0083199 A1 Mar. 24, 2016

(30) Foreign Application Priority Data

Sep. 18, 2014 (JP) .................................. 2014-190204

(51) Int. Cl.
| | | |
|---|---|---|
| *B65G 47/90* | (2006.01) | |
| *B25J 9/00* | (2006.01) | |
| *B25J 9/16* | (2006.01) | |
| *B25J 19/02* | (2006.01) | |
| *G05B 19/418* | (2006.01) | |

(52) U.S. Cl.
CPC .......... *B65G 47/905* (2013.01); *B25J 9/0093* (2013.01); *B25J 9/1697* (2013.01); *B25J 19/021* (2013.01);
(Continued)

(58) Field of Classification Search
CPC .. B65G 47/905; B65G 47/907; B65G 47/917; B65G 47/918; B25J 9/0093;
(Continued)

(56) References Cited

U.S. PATENT DOCUMENTS

| | | | | |
|---|---|---|---|---|
| 7,690,706 B2* | 4/2010 | Wild | .................... | B65G 47/907 |
| | | | | 198/468.3 |
| 8,868,231 B2* | 10/2014 | Moore | ................... | B25J 9/0084 |
| | | | | 209/1 |

(Continued)

FOREIGN PATENT DOCUMENTS

| | | |
|---|---|---|
| CN | 102837318 | 12/2012 |
| JP | 08-336784 | 12/1996 |
| JP | 2014-104524 | 6/2014 |

OTHER PUBLICATIONS

Extended European Search Report for corresponding EP Application No. 15183816.6-1807, dated Feb. 10, 2016.
Chinese Office Action for corresponding CN Application No. 201510587169.6, dated Nov. 11, 2016.
Chinese Office Action for corresponding CN Application No. 201510587169.6, dated May 9, 2017.
(Continued)

*Primary Examiner* — Glenn F Myers
(74) *Attorney, Agent, or Firm* — Mori & Ward, LLP

(57) ABSTRACT

A robot system includes a conveyor, a robot, and a controller. The conveyor is configured to convey a workpiece. The robot includes a plurality of holders configured to hold the workpiece. The controller is configured to control the robot to hold the workpiece conveyed on the conveyor and transfer the workpiece to a predetermined place using at least one holder among the plurality of holders. The controller includes a divided area setter and an allocator. The divided area setter is configured to set a plurality of divided areas on the conveyor in a width direction of the conveyor, and is configured to store the plurality of divided areas in a storage. The allocator is configured to allocate the plurality of holders respectively to the plurality of divided areas so as to hold the workpiece when the workpiece is conveyed in the plurality of divided areas.

9 Claims, 7 Drawing Sheets

(52) U.S. Cl.
CPC .......... *B25J 19/023* (2013.01); *B65G 47/907* (2013.01); *G05B 19/4182* (2013.01); *G05B 2219/37555* (2013.01); *G05B 2219/39102* (2013.01); *G05B 2219/40007* (2013.01); *Y02P 90/083* (2015.11); *Y10S 901/02* (2013.01)

(58) Field of Classification Search
CPC ...... B25J 9/1697; B25J 19/021; B25J 19/023; G05B 2219/37555; G05B 2219/39102; G05B 2219/40007; G05B 2219/31274; G05B 2219/35166; G05B 19/4182
See application file for complete search history.

(56) References Cited

U.S. PATENT DOCUMENTS

| | | | |
|---|---|---|---|
| 9,272,421 B2* | 3/2016 | Subotincic | B25J 9/1612 |
| 2012/0236140 A1* | 9/2012 | Hazeyama | B25J 9/1697 348/94 |
| 2012/0323357 A1 | 12/2012 | Izumi et al. | |
| 2012/0323363 A1 | 12/2012 | Izumi et al. | |

OTHER PUBLICATIONS

Japanese Office Action for corresponding JP Application No. 2014-190204, dated Dec. 19, 2017 (w/ English machine translation).
Japanese Office Action for corresponding JP Application No. 2014-190204, dated Jul. 31, 2018 (w/ English machine translation).

* cited by examiner

ROBOT SYSTEM AND METHOD FOR PICKING WORKPIECE

BACKGROUND OF THE INVENTION

The present application claims priority under 35 U.S.C. § 119 to Japanese Patent Application No. 2014-190204, filed Sep. 18, 2014. The contents of this application are incorporated herein by reference in their entirety.

BACKGROUND

Field of the Invention

The embodiments disclosed herein relate a robot system and a method for picking a workpiece.

Discussion of the Background

Japanese Unexamined Patent Application Publication No. 08-336784 discloses what is called a multiple-picking object processor for use in a robot system in which conveyors or similar devices convey workpieces and a robot holds the workpieces to transfer the workpieces to another place.

In the multiple-picking object processor, the robot includes a plurality of holders to hold a plurality of workpieces simultaneously in transferring the plurality of workpieces to another place.

In many of such multiple-picking object processors, a predetermined order is determined in advance for the holders to operate and hold the workpieces. The workpieces are held in the order in which the workpieces are conveyed on the conveyor.

SUMMARY

According to one aspect of the present disclosure, a robot system includes a conveyor, a robot, and a controller. The conveyor is configured to convey at least one workpiece. The robot includes a plurality of holders configured to hold the at least one workpiece. The controller is configured to control the robot to hold the at least one workpiece conveyed on the conveyor and transfer the at least one workpiece to a predetermined place using at least one holder among the plurality of holders. The controller includes a divided area setter and an allocator. The divided area setter is configured to set a plurality of divided areas on the conveyor in a width direction of the conveyor, and is configured to store the plurality of divided areas in a storage. The allocator is configured to allocate the plurality of holders respectively to the plurality of divided areas so as to hold the at least one workpiece when the at least one workpiece is conveyed in the plurality of divided areas.

According to another aspect of the present disclosure, a method for picking a workpiece includes conveying at least one workpiece using a conveyor through a movable area of a robot including a plurality of holders. A conveyance situation in which the at least one workpiece is conveyed on the conveyor is detected. Based on the conveyance situation, a divided area to which the at least one workpiece corresponds is identified from among a plurality of divided areas of the conveyor that are divided in a width direction of the conveyor. The robot is operated to hold the at least one workpiece using one holder among the plurality of holders that is allocated to the divided area.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A robot system and a method for picking a workpiece according to an embodiment of the present disclosure will be described in detail below with reference to the accompanying drawings. The following embodiments are provided for exemplary purposes only and are not intended to limit the present disclosure.

Figure 1A:
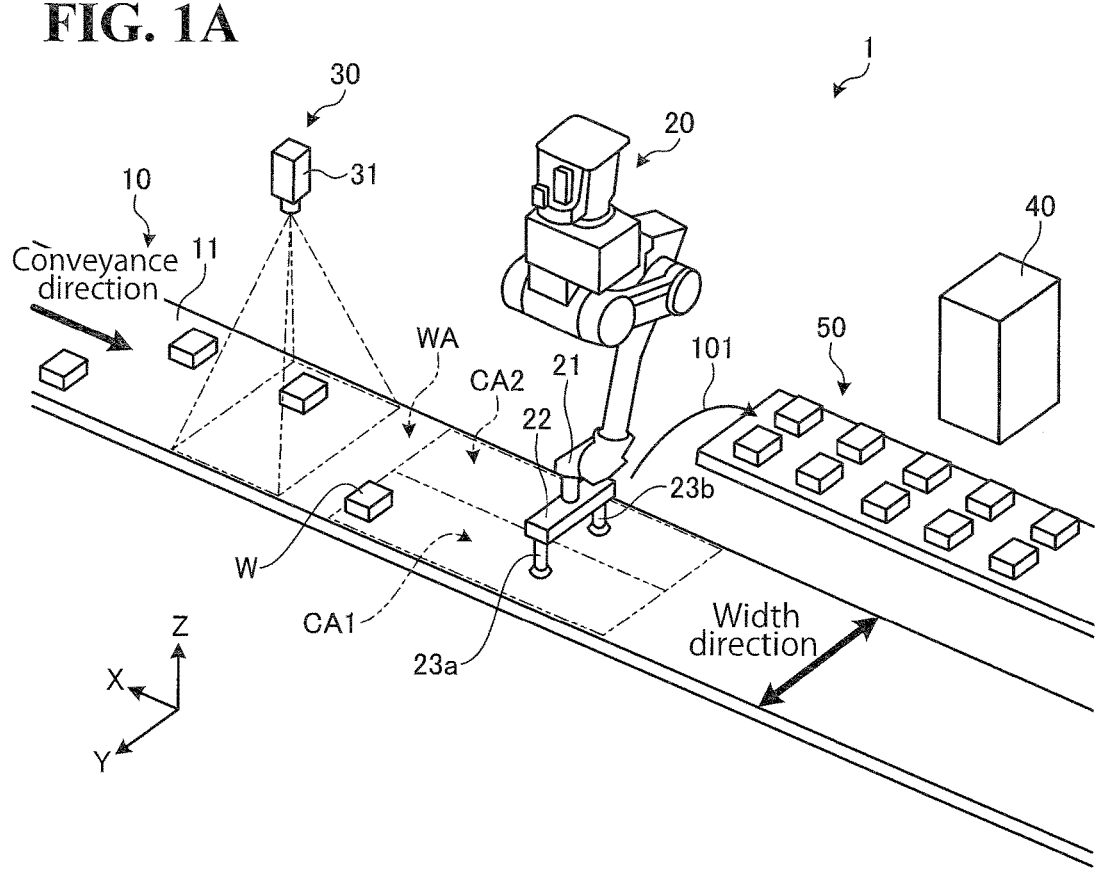
FIG. 1A is a schematic perspective view of a robot system according to an embodiment, illustrating an arrangement configuration of the robot system.
Figure 1B:
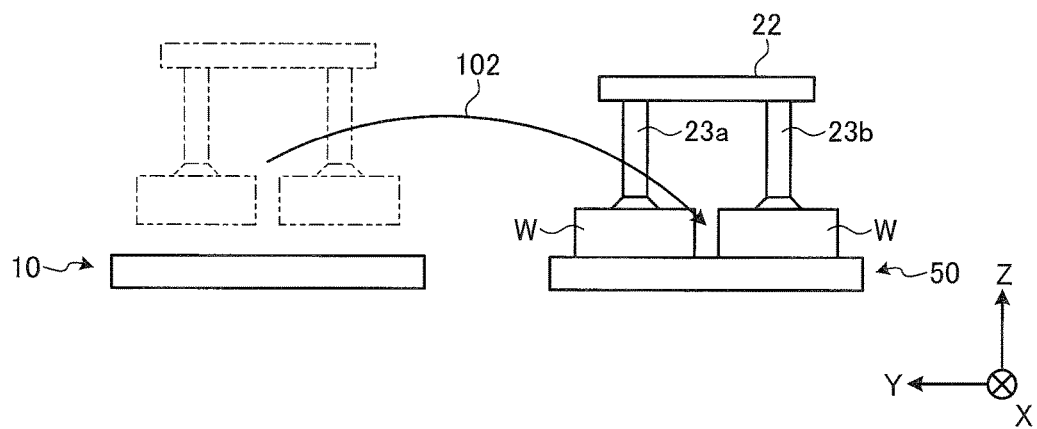
FIG. 1B is a schematic diagram illustrating one round of transfer movement.
Figure 1C:
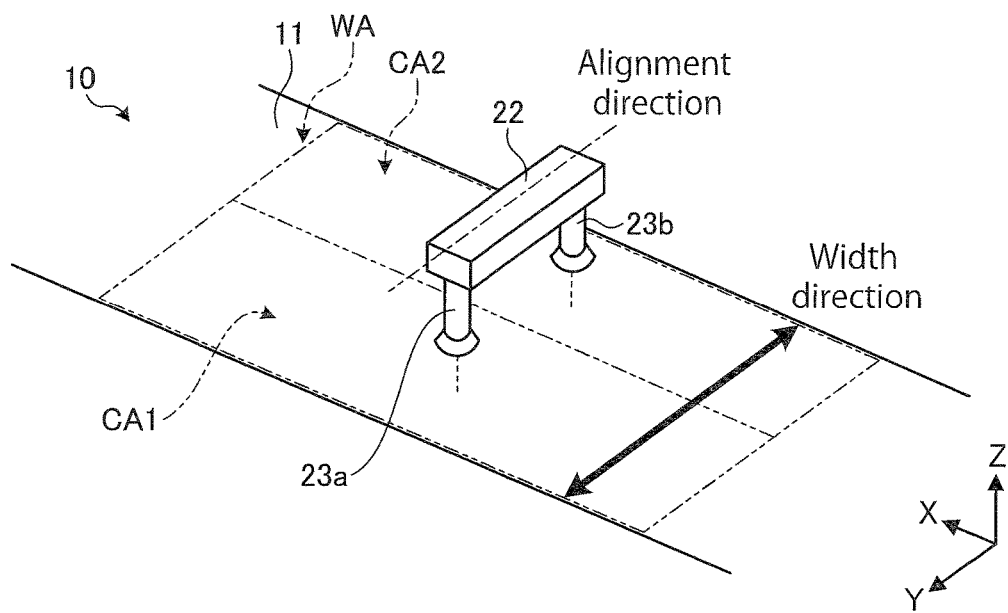
FIG. 1C is a schematic diagram illustrating a position of a robot hand in a basic posture in relation to positions of divided areas.

An outline of a robot system 1 according to the embodiment will be described with reference to FIGS. 1A to 1C. FIG. 1A is a schematic perspective view of a robot system 1 according to this embodiment, illustrating an arrangement configuration of the robot system 1. FIG. 1B is a schematic diagram illustrating one round of transfer movement. FIG. 1C is a schematic diagram illustrating a position of a robot hand in a basic posture in relation to positions of divided areas.

For ease of description, FIG. 1A illustrates a three-dimensional orthogonal coordinate system including a Z axis with its vertically upward direction being assumed the positive direction. This orthogonal coordinate system may also be illustrated in some other drawings referred to in the following description.

As illustrated in FIG. 1A, the robot system 1 according to this embodiment includes a conveyor 10, a robot 20, a detector 30, and a controller 40.

The conveyor 10 is a conveyance device that conveys workpieces W on a conveyance path 11 from the upstream side toward the downstream side. In this embodiment, the conveyor 10 is a belt conveyor. This configuration, however, should not be construed in a limiting sense. The conveyor 10 may be any other conveyance device insofar as the conveyance device is capable of conveying the workpieces W in a predetermined conveyance direction. In this embodiment, the conveyance direction is the negative direction of the X axis.

The robot 20 is an articulated robot secured on an installation object such as a ceiling, a wall, and a floor. The robot 20 holds workpieces W conveyed on the conveyor 10 and transfers the workpieces W to another place. In this embodiment, the robot 20 transfers the workpieces W to a conveyor 50, which is parallel to the conveyor 10 (see the arrow 101 in FIG. 1A).

The robot 20 includes an arm distal end 21. To the arm distal end 21, the robot hand to hold the workpieces W is attached.

The robot hand includes a plurality of holders 23a and 23b, and a support 22. The holders 23a and 23b hold the workpieces W. The support 22 is turnably disposed on the arm distal end 21 and supports the plurality of holders 23a and 23b.

The holders 23a and 23b hold workpieces W by sucking the workpieces W using a suction device such as a vacuum pump. The robot 20 holds a plurality of workpieces W using the holders 23a and 23b. The robot 20 holds and moves the workpieces W to above the conveyor 50. Then, the suction force of the suction device is released to place the workpieces W onto the conveyor 50.

Specifically, as illustrated in FIG. 1B, a plurality of workpieces W are sucked on both the holders 23a and 23b. That is, the robot 20 uses both the holders 23a and 23b to transfer the plurality of workpieces W from the conveyor 10 to the conveyor 50 at once (see the arrow 102 in FIG. 1B).

After a round of this transfer movement, the robot 20 returns to its predetermined "basic posture". From the "basic posture", the robot 20 starts a next round of transfer movement to hold workpieces W.

As illustrated in FIG. 1C, in the "basic posture", the robot hand is positioned above the conveyor 10 with the holders 23a and 23b, which are parallel to each other, aligned in a direction approximately parallel to the "width direction" of the conveyor 10. The "width direction" is approximately perpendicular to the conveyance direction of the conveyor 10 (see FIGS. 1A and 1C).

On the conveyance path 11 of the conveyor 10, the robot 20 has a movable area WA. The movable area WA is divided in advance in the "width direction" into divided areas CA1 and CA2. The holder 23a is allocated to the divided area CA1, since the holder 23a is closest of the holders 23a and 23b to the divided area CA1 when the robot 20 is in its "basic posture". The holder 23b is allocated to the divided area CA2, since the holder 23b is closest of the holders 23a and 23b to the divided area CA2 when the robot 20 is in its "basic posture". This allocation is performed by an allocator 41c, which will be described later (see FIG. 5).

Thus, the holders 23a and 23b are assigned their own "territories", namely, the divided areas CA1 and CA2, respectively. While in this embodiment the robot 20 includes two holders, the robot 20 may include three or more holders.

The robot hand of the robot 20 may be any other robot hand insofar as the robot hand is capable of holding the workpieces W. For example, the robot 20 may include a robot hand to clamp, instead of suck, to hold the workpieces W.

In this embodiment, the robot 20 is a vertical articulated robot. This configuration, however, should not be construed in a limiting sense. The robot 20 may be a horizontal articulated robot, a parallel link robot, an orthogonal robot, or any other robot insofar as the robot is capable of holding and transferring the workpieces W.

The detector 30 is disposed at a further upstream position on the conveyor 10 than the robot 20. The detector 30 includes a camera 31, for example. The camera 31 picks up an image of a predetermined area on the conveyance path 11 to detect a conveyance situation in which the workpieces W are conveyed. The image picked up by the camera 31 is output to the controller 40 through a communication network (not illustrated) such as a Local Area Network (LAN).

The controller 40 is coupled in a communicable manner to various elements such as the conveyor 10, the robot 20, and the detector 30. It is noted that any form of connection, wired or wireless, may be employed. The controller 40 includes various control units, processors, and storages so as to control operations of the various elements coupled to the controller 40.

For example, based on a job program acquired through an input device (such as a programming pendant) or through an upper-level device, not illustrated, the controller 40 generates a movement signal to cause the robot 20 to operate. Then, the controller 40 outputs the movement signal to the robot 20 so as to control the movement of the robot 20.

The movement signal is generated in the form of, for example, a pulse signal to each servomotor in each joint of the robot 20. A specific configuration of the controller 40 will be described later with reference to FIG. 5.

With the above-described configuration of the robot system 1 according to this embodiment, the camera 31 picks up an image on the conveyance path 11 of the conveyor 10. Based on the image picked up by the camera 31, the controller 40 acquires a conveyance situation in which the workpiece W are conveyed on the conveyance path 11.

Based on the acquired conveyance situation, the controller 40 makes an instruction to the robot 20 to make a transfer movement, which is to hold the workpieces W using the holders 23a and 23b and transfer the workpieces W to the conveyor 50. In response to the instruction from the controller 40, the robot 20 performs the transfer movement. In the following description, the action of holding a workpiece W in transferring workpieces W, that is, taking a workpiece W from the conveyor 10 will be referred to as "picking".

Figure 2A:
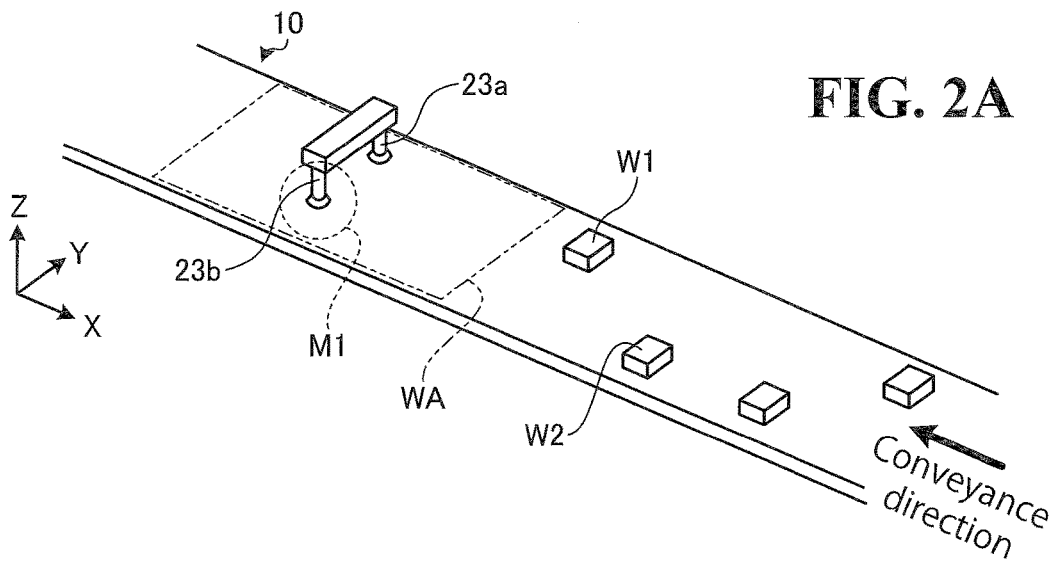
FIG. 2A is a first schematic perspective view of a robot system, illustrating a picking movement in a method according to a comparative example for picking a workpiece.
Figure 2B:
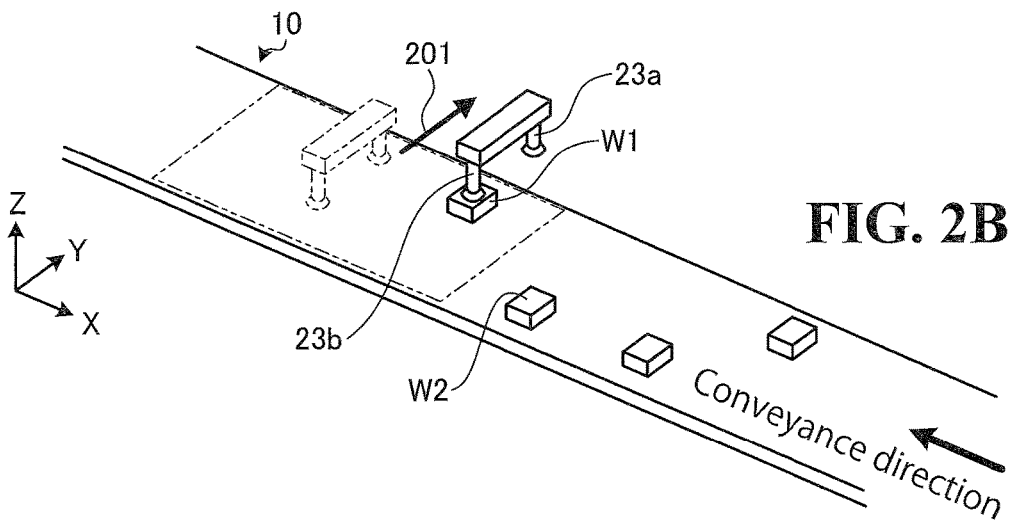
FIG. 2B is a second schematic perspective view of the robot system, illustrating the picking movement in the comparative method for picking a workpiece.
Figure 2C:
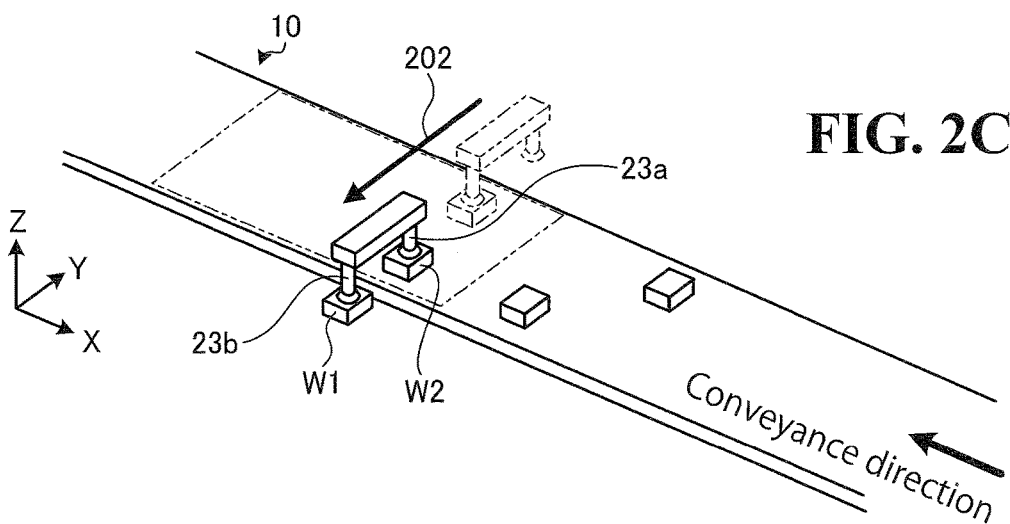
FIG. 2C is a third schematic perspective view of the robot system, illustrating the picking movement in the comparative method for picking a workpiece.

Next, by referring to FIGS. 2A to 4C, a method for picking a workpiece using the robot system 1 will be described in relation to a comparative method for picking a workpiece. FIGS. 2A to 2C are first to third schematic perspective views of the robot system, illustrating a picking movement in the comparative method for picking a workpiece.

Figure 3A:
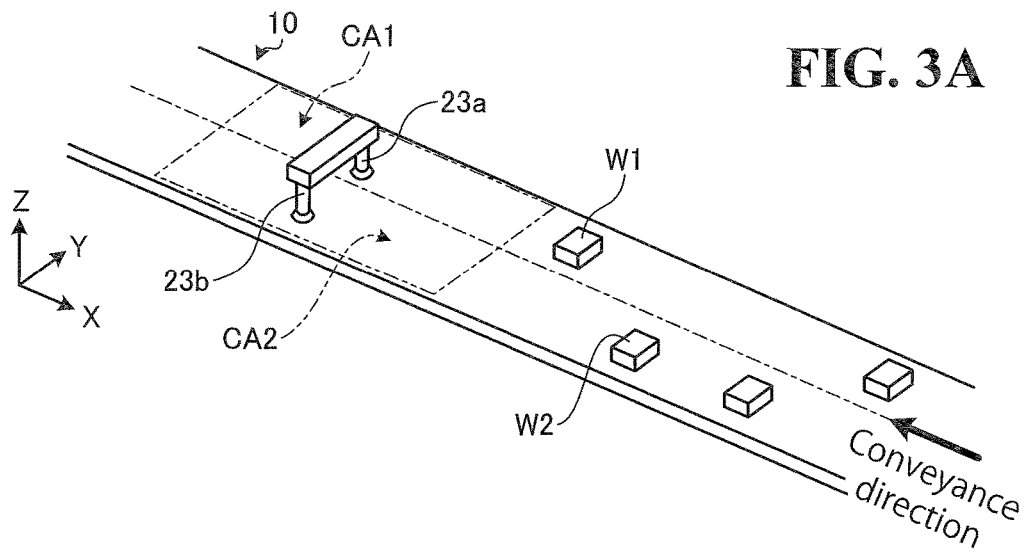
FIG. 3A is a first schematic perspective view of the robot system according to the embodiment, illustrating a basic picking movement in a method according to the embodiment for picking a workpiece.
Figure 3B:
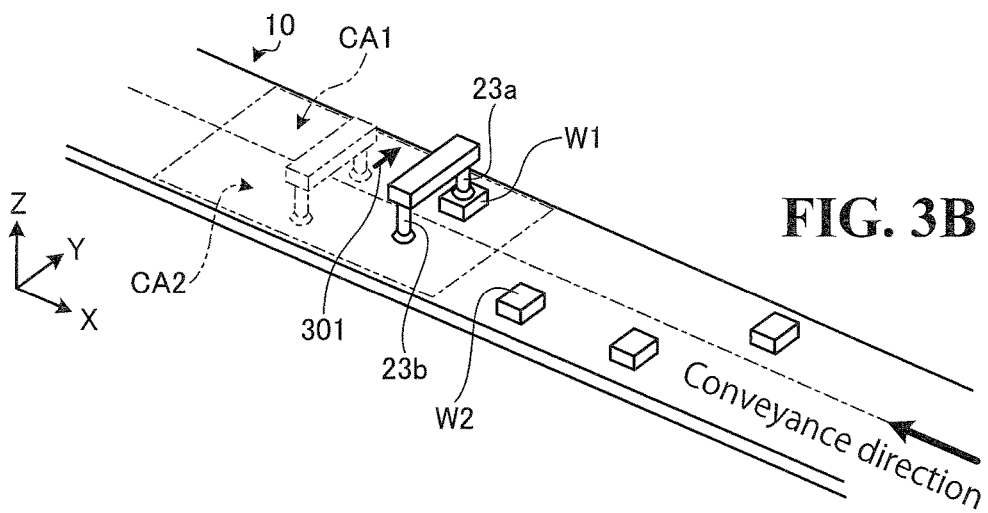
FIG. 3B is a second schematic perspective view of the robot system according to the embodiment, illustrating the basic picking movement in the method according to the embodiment for picking a workpiece.
Figure 3C:
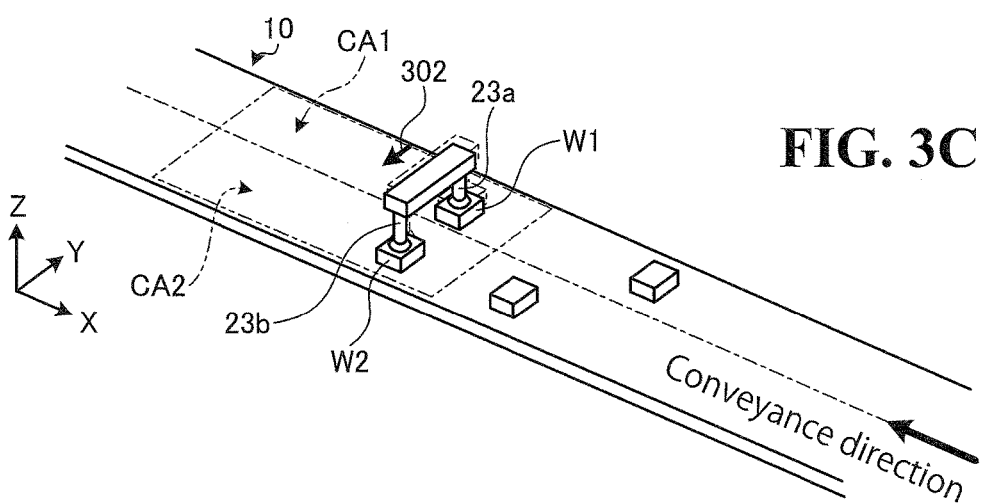
FIG. 3C is a third schematic perspective view of the robot system according to the embodiment, illustrating the basic picking movement in the method according to the embodiment for picking a workpiece.
Figure 4A:
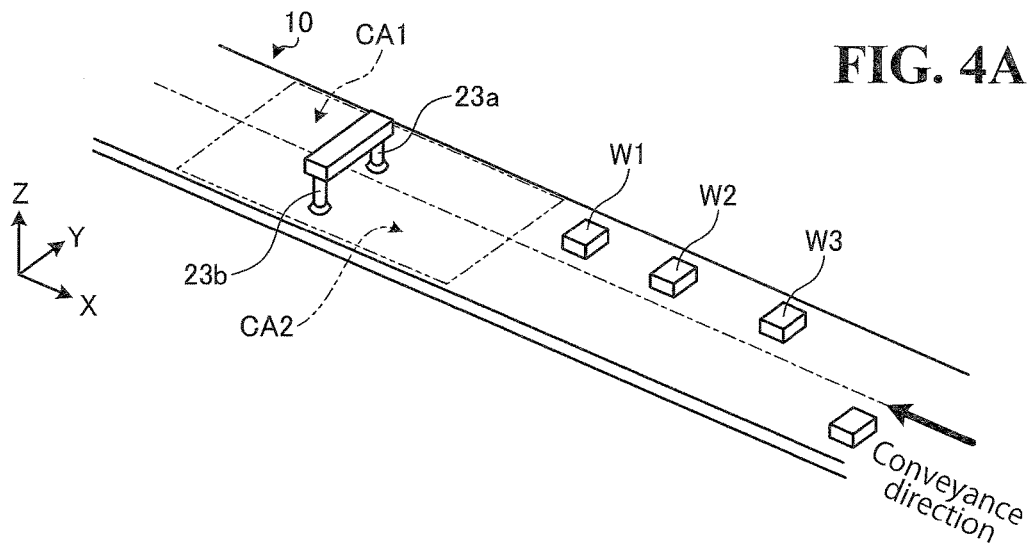
FIG. 4A is a first schematic perspective view of the robot system according to the embodiment, illustrating an exceptional picking movement in the method according to the embodiment for picking a workpiece.
Figure 4B:
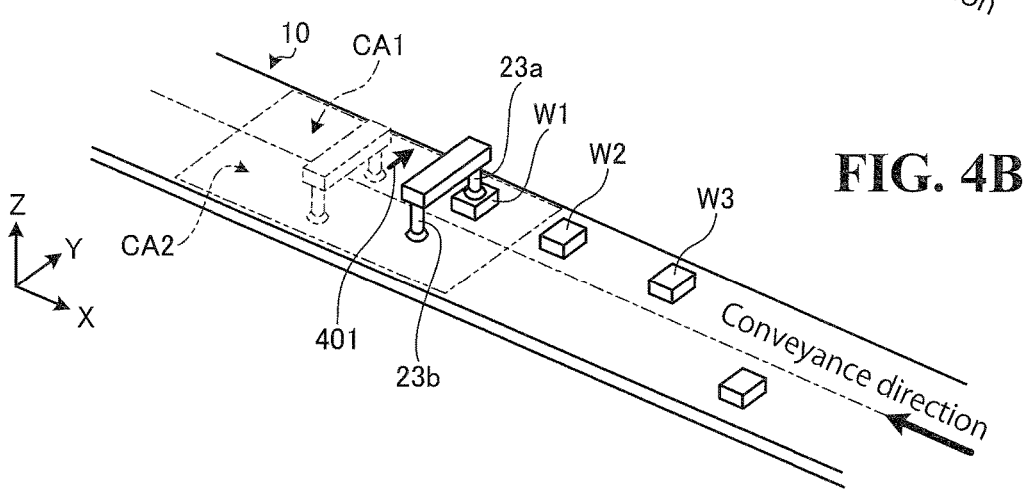
FIG. 4B is a second schematic perspective view of the robot system according to the embodiment, illustrating the exceptional picking movement in the method according to the embodiment for picking a workpiece.
Figure 4C:
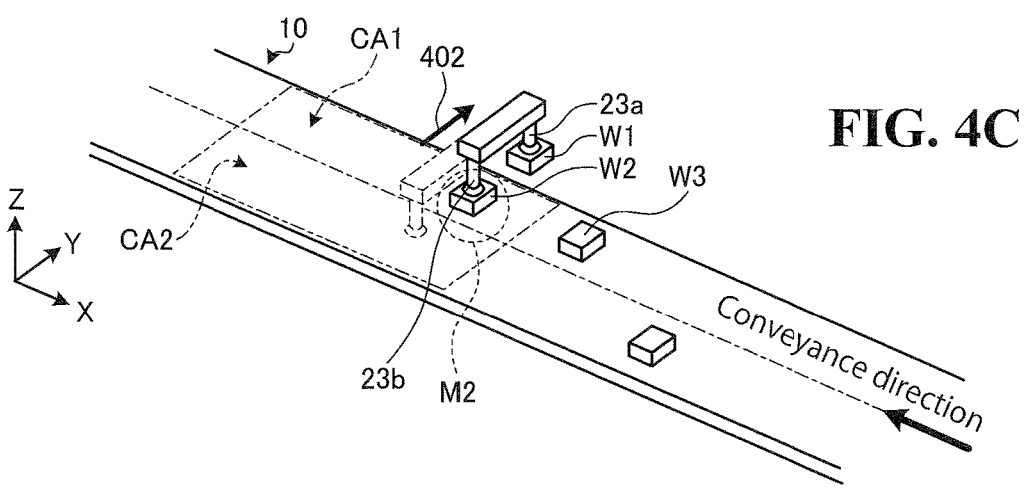
FIG. 4C is a third schematic perspective view of the robot system according to the embodiment, illustrating the exceptional picking movement in the method according to the embodiment for picking a workpiece.

FIGS. 3A to 3C are first to third schematic perspective views of the robot system 1, illustrating a basic picking movement in the method according to this embodiment for picking a workpiece. FIGS. 4A to 4C are first to third schematic perspective views of the robot system 1, illustrating an exceptional picking movement in the method according to this embodiment for picking a workpiece. For convenience of description, like reference numerals designate corresponding or identical elements throughout FIG. 2A to FIG. 4C.

As illustrated in FIG. 2A, in the comparative method for picking a workpiece, a predetermined order is determined in advance for the holders 23a and 23b to operate and pick workpieces W. The workpieces W are picked in the order in which the workpieces W are conveyed on the conveyor 10. In this example, none of the holder 23a or 23b has been used yet, and the holder 23b is the first to be used (see the dashed circle M1 in FIG. 2A).

Specifically, as illustrated in FIG. 2B, when a workpiece W1 conveyed on the conveyor 10 is partial to the positive direction of the Y axis, the robot 20 picks the workpiece W1 using the holder 23b even though the holder 23b is partial to the negative direction of the Y axis. Then, as illustrated in FIG. 2C, when a workpiece W2 conveyed on the conveyor 10 is partial to the negative direction of the Y axis, the robot 20 picks the workpiece W2 using the holder 23a even though the holder 23a is partial to the positive direction of the Y axis.

That is, in the comparative method for picking a workpiece, the robot 20 may have to move over a long distance in the picking movement due to, for example, the positions of the workpieces W on the conveyor 10 (see the arrow 201 in FIG. 2B and the arrow 202 in FIG. 2C). Because of the elongated distance of movement of the robot 20, the comparative method for picking a workpiece may degrade conveyance efficiency of the workpieces W.

In view of this, in the method according to this embodiment for picking a workpiece, the holders 23a and 23b are assigned their own territories, namely, the divided areas CA1 and CA2, respectively.

Specifically, as illustrated in FIG. 3A, in the method according to this embodiment for picking a workpiece, the holder 23a is allocated to the divided area CA1 as the holder 23a's territory, and the holder 23b is allocated to the divided area CA2 as the holder 23b's territory.

As illustrated in FIG. 3B, a workpiece W1 conveyed on the conveyor 10 is partial to the positive direction of the Y axis and enters the divided area CA1 The robot 20 picks the workpiece W1 using the holder 23a considering that the holder 23a is similarly partial to the positive direction of the Y axis. As illustrated in FIG. 3C, a workpiece W2 conveyed on the conveyor 10 is partial to the negative direction of the Y axis and enters the divided area CA2. The robot 20 picks the workpiece W2 using the holder 23b considering that the holder 23b is similarly partial to the negative direction of the Y axis.

Thus, the method according to this embodiment for picking a workpiece shortens the distance involved in the picking movement (see the arrow 301 in FIG. 3B and the arrow 302 in FIG. 3C), as compared with the comparative method for picking a workpiece. That is, the method according to this embodiment for picking a workpiece improves efficiency in the conveyance of the workpieces W, that is, ensures more efficient transfer of the workpieces W.

FIGS. 3A to 3C illustrate a basic picking movement in the method according to this embodiment for picking a workpiece. It is possible for workpieces W to be continuously partial to one side of the conveyor 10. In this case, the method for picking a workpiece according to this embodiment uses an exceptional picking movement.

For example, as illustrated in FIG. 4A, assume that workpieces W1 to W3 are continuously partial to the positive direction of the Y axis of the conveyor 10, that is, the workpieces W1 to W3 are about to enter the divided area CA1.

In this case, as illustrated in FIG. 4B, the method according to this embodiment for picking a workpiece first uses the above-described basic picking movement to pick the workpiece W1, which has entered the divided area CA1, using the holder 23a.

Then, the workpiece W2 subsequently enters the divided area CA1 and is picked exceptionally by the holder 23b when the holder 23b is not being used, even though the holder 23b is originally in charge of the divided area CA2 (see the dashed circle M2 in FIG. 4C).

Thus, even when workpieces W are continuously partial to one side of the conveyor 10, all the workpieces W are reliably transferred, without any one workpiece W being missed in picking.

The workpieces W1 and W2 in the state illustrated in FIG. 4C are transferred to the conveyor 50. Then, a workpiece W3 and subsequent workpieces W are picked in the above-described basic picking movement. That is, in the method according to this embodiment for picking a workpiece, in the case where workpieces W are continuously partial to one side of the conveyor 10, the movement distance involved in the picking of these workpieces W temporarily increases (see the arrow 402 in FIG. 4C). In the other cases, however, the basic picking movement is used (see the arrow 401 in FIG. 4B). This configuration improves conveyance efficiency.

Figure 5:
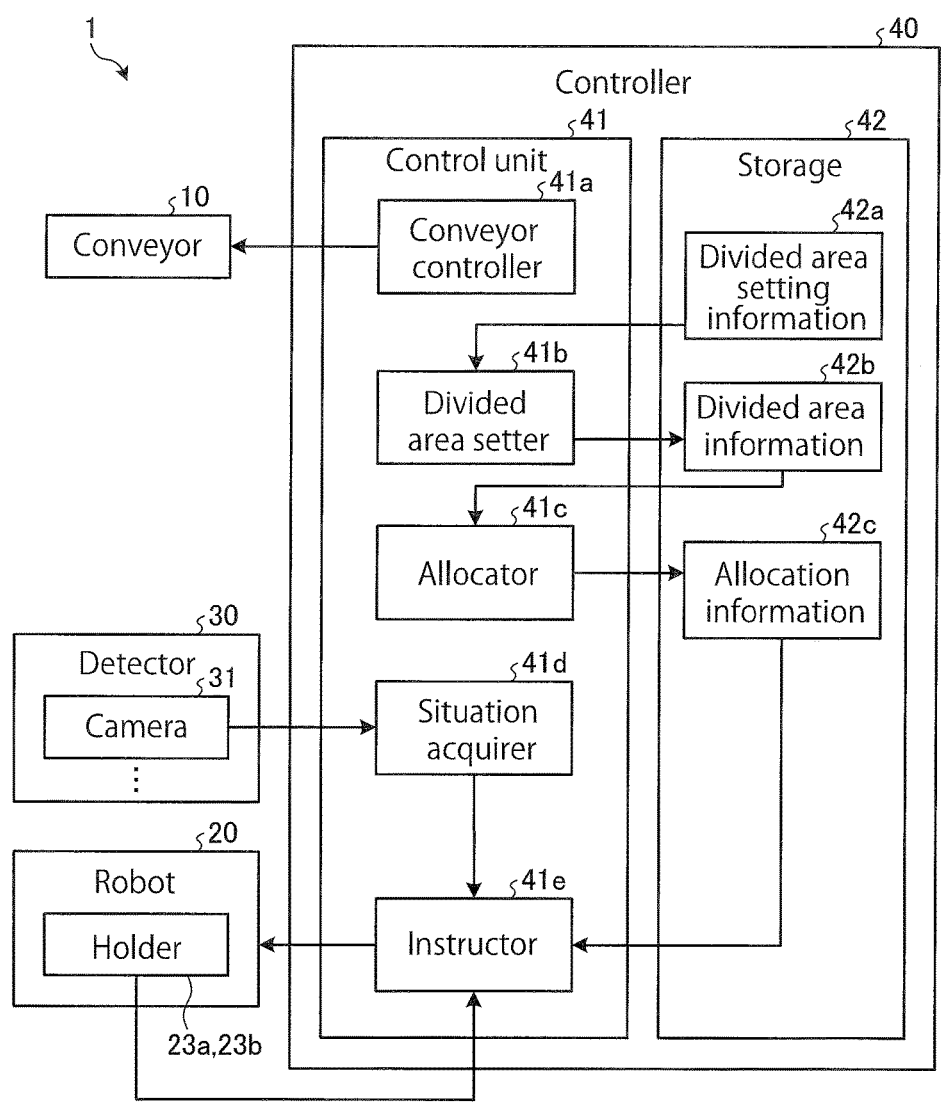
FIG. 5 is a block diagram illustrating the robot system according to the embodiment.

Next, by referring to FIG. 5, a block configuration of the robot system 1 according to this embodiment will be described. FIG. 5 is a block diagram illustrating the robot system 1 according to this embodiment. It is noted that FIG. 5 only illustrates those components necessary for description of the robot system 1, omitting those components of general nature.

The following description by referring to FIG. 5 will mainly focus on the internal configuration of the controller 40, and may occasionally simplify or omit the components that have been already described by referring to, for example, FIG. 1A.

As illustrated in FIG. 5, the controller 40 includes a control unit 41 and a storage 42. The control unit 41 includes a conveyor controller 41a, a divided area setter 41b, an allocator 41c, a situation acquirer 41d, and an instructor 41e.

The storage 42 is a storage device such as a hard disk drive and a non-volatile memory, and includes divided area setting information 42a, divided area information 42b, and allocation information 42c.

It is noted that not all the elements of the controller 40 illustrated in FIG. 5 need to be arranged within the single controller 40. Another possible embodiment is that at least one of the divided area setting information 42a, the divided area information 42b, and the allocation information 42c stored in the storage 42 is stored in an inner memory of the robot 20. Still another possible embodiment is that at least one of the divided area setting information 42a, the divided area information 42b, and the allocation information 24c is stored in an upper-level device upper than the controller 40, and acquired as necessary from the upper-level device by the controller 40.

A non-limiting example of the control unit 41 is a Central Processing Unit (CPU) that is in charge of overall control of the controller 40. The conveyor controller 41a controls the conveyor 10, which is arranged to pass through a movable area WA of the robot 20, to convey workpieces W to the movable area WA of the robot 20.

The divided area setter 41b sets the imaginary divided areas CA1 and CA2 (see FIGS. 1A and 1C) on the conveyor 10 based on the divided area setting information 42a, and stores the divided areas CA1 and CA2 as the divided area information 42b.

The divided area setting information 42a is necessary information in setting the divided areas CA1 and CA2, and includes the position and dimensions of the movable area WA of the robot 20, the width of the conveyor 10, and the number of holders of the robot hand.

The divided area information 42b includes a result of setting by the divided area setter 41b such as the positions and dimensions of the divided areas CA1 and CA2.

Based on the divided area information 42b, the allocator 41c allocates the holders 23a and 23b respectively to the divided areas CA1 and CA2 so as to hold a workpiece W conveyed in the divided areas CA1 and CA2. In other words, the allocator 41c assigns the holders 23a and 23b their own basic territories.

Also, the allocator 41c stores a result of the allocation as the allocation information 42c. That is, the allocation information 42c relates the divided areas CA1 and CA2 respectively to the holders 23a and 23b.

Based on an image received from the camera 31, the situation acquirer 41d acquires a conveyance situation in which the workpieces W are conveyed. While in this embodiment the detector 30 includes the camera 31, the detector 30 may include any other device for the purpose of detecting the conveyance situation in which the workpieces W are conveyed.

For example, the detector 30 may include photoelectric sensors and an encoder of the conveyor 10. Based on information received from these devices, the situation acquirer 41 d is also capable of acquiring a conveyance situation in which the workpieces W are conveyed. The situation acquirer 41d notifies the instructor 41e of a result of the acquisition.

In response to the result of the acquisition received from the situation acquirer 41d, in response to availability of the holders 23a and 23b received from the holders 23a and 23b, and in response to the allocation information 42c, the instructor 41e instructs the robot 20 to make a movement to transfer the workpieces W.

Specifically, unless the workpieces W are conveyed continuously in either the divided area CA1 or the divided area CA2, the instructor 41e instructs the robot 20 to hold and transfer the workpieces W in the above-described basic picking movement (see FIGS. 3A to 3C).

Alternatively, when the workpieces W are conveyed continuously in either the divided area CA1 or the divided area CA2, the instructor 41e instructs the robot 20 to hold and transfer the workpieces W in the above-described exceptional picking movement (see FIGS. 4A to 4C).

When one round of transfer movement is complete, the instructor 41e instructs the robot 20 to take its basic posture.

In the description by referring to FIG. 5, the divided area setter 41b sets the divided areas CA1 and CA2 based on the divided area setting information 42a. This configuration, however, should not be construed in a limiting sense. Another possible embodiment is that the divided area setter 41b divides an image picked up by the camera 31 into the divided areas CA1 and CA2 in the width direction of the conveyor 10, and stores the divided areas CA1 and CA2 as the divided area information 42b.

Figure 6:
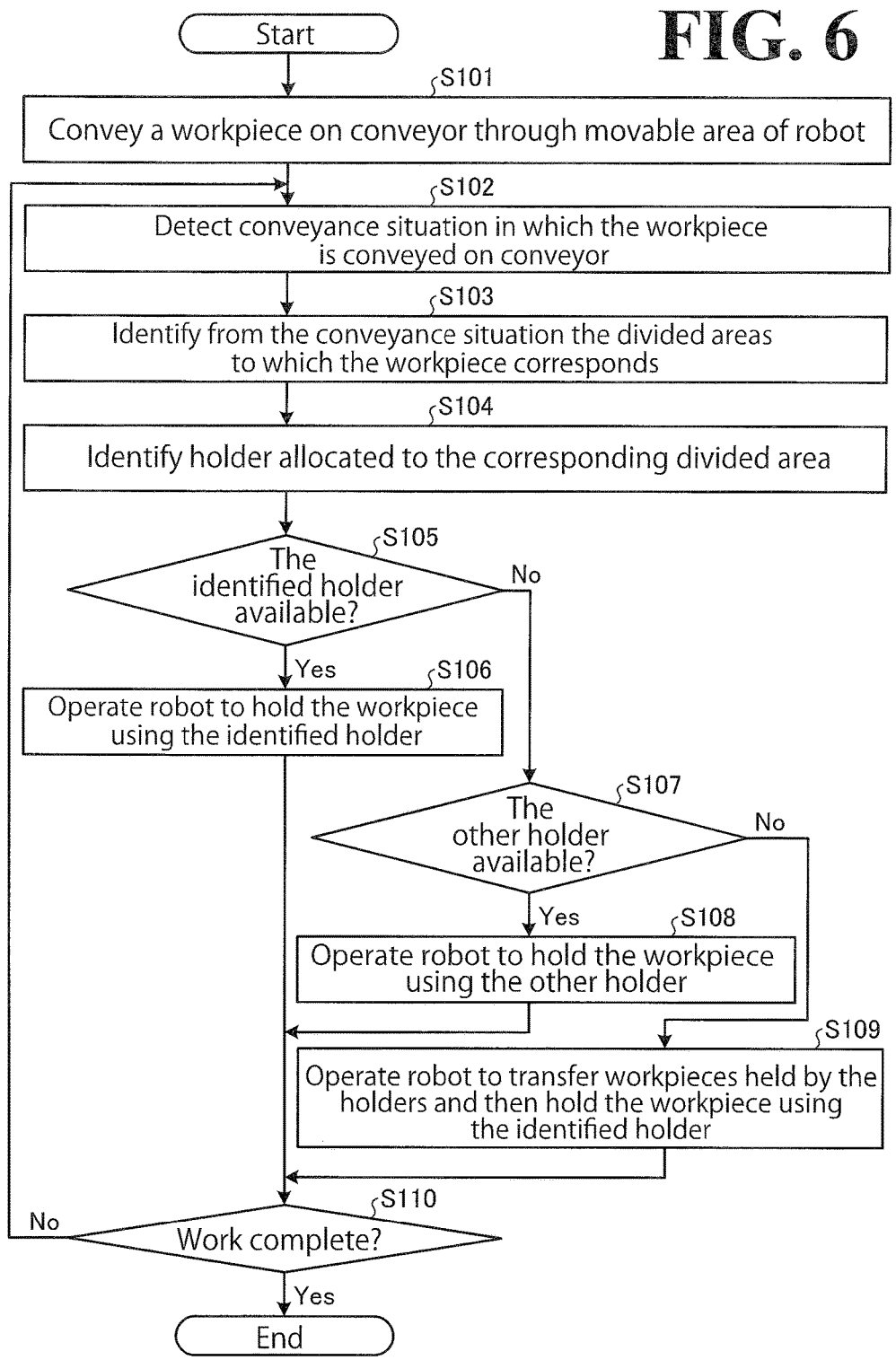
FIG. 6 is a flowchart of a procedure for processing performed by the robot system according to the embodiment.

Next, by referring to FIG. 6, a procedure for processing performed by the robot system 1 according to this embodiment will be described. FIG. 6 is a flowchart of the procedure for processing performed by the robot system 1 according to this embodiment.

As illustrated in FIG. 6, the controller 40 controls the conveyor 10 to convey workpieces W through the movable area WA of the robot 20 (step S101). The conveyor 10 is controlled by the conveyor controller 41a to convey the workpiece W until the completion of work. It will be readily appreciated that this embodiment is implementable without the control of changing the conveyance speed of the conveyor.

Next, the detector 30 detects a conveyance situation in which the workpieces W are conveyed on the conveyor 10 (step S102). Then, based on the conveyance situation acquired by the situation acquirer 41d, the instructor 41e identifies the divided area, CA1 or CA2, to which a workpiece W corresponds (step S103).

Next, the instructor 41e identifies the holder, 23a or 23b, that is allocated to the divided area, CA1 or CA2, of interest (step S104). For the sake of description, assume that the instructor 41e identifies the holder 23a.

Then, the instructor 41e determines whether the identified holder 23a is not being used (step S105). When the holder 23a is not being used ("Yes" at step S105), the instructor 41e operates the robot 20 to hold the workpiece W using the holder 23a (step S106).

When the holder 23a is in use ("No" at step S105), the instructor 41e determines whether the other holder, namely, the holder 23b is not being used (step S107).

When the holder 23b is not being used ("Yes" at step S107), the instructor 41e operates the robot 20 to hold the workpiece W using the holder 23b (step S108).

When the holder 23b is in use ("No" at step S107), which means that both the holders 23a and 23b are in use, the instructor 41e operates the robot 20 to transfer the workpieces W held by the holders 23a and 23b to the conveyor 50, and then to hold the workpiece W using the holder 23a (step S109).

Then, a determination is made as to whether the work is complete (step S110). When the work is complete ("Yes" at step S110), the processing ends. When the work is not complete ("No" at step S110), the controller 40 repeats the processing that starts from step S102.

As has been described hereinbefore, the robot system according to this embodiment includes the conveyor, the robot, and the controller. The conveyor conveys workpieces. The robot includes the plurality of holders to hold the workpieces.

The controller controls the robot to make a movement to hold a workpiece conveyed on the conveyor using one of the holders and to transfer the workpiece to a predetermined place. The controller includes the divided area setter and the allocator.

The divided area setter sets the plurality of divided areas on the conveyor in the width direction of the conveyor and stores the divided areas in the storage. The allocator allocates the holders respectively to the divided areas so as to hold the workpiece when the workpiece is conveyed in the divided areas.

With this configuration, the robot system according to this embodiment ensures efficient transfer of the workpieces.

In this embodiment, the robot makes the exceptional picking movement in an attempt to eliminate or minimize missed picking of the workpieces. This configuration, however, should not be construed in a limiting sense. Another possible embodiment is to add the control of changing the conveyance speed of the conveyor.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system comprising:
   a conveyor configured to convey at least one workpiece in a conveying direction in relation to a stationary floor;
   a robot comprising a plurality of holders configured to hold the at least one workpiece; and
   a controller configured to control the robot to hold the at least one workpiece conveyed on the conveyor and transfer the at least one workpiece to a predetermined place using at least one holder among the plurality of holders, the controller comprising:
      a divided area setter configured to set a plurality of divided areas on the conveyor in a width direction of the conveyor, and configured to store the plurality of divided areas in a storage, the plurality of divided areas being set at a fixed location with respect to the stationary floor as the conveyor conveys the at least one workpiece in the conveying direction; and
      an allocator configured to allocate the plurality of holders respectively to the plurality of divided areas so as to hold the at least one workpiece when the at least one workpiece is conveyed in the plurality of divided areas.

2. The robot system according to claim 1, further comprising a detector configured to detect a conveyance situation in which the at least one workpiece is conveyed on the conveyor,
   wherein a first holder among the plurality of holders is allocated to a first divided area among the plurality of divided areas to hold the at least one workpiece when the at least one workpiece is conveyed in the first divided area, and
   wherein when the detector detects another workpiece being conveyed to the first divided area while the first holder is holding the at least one workpiece in the first divided area, and when a second holder that is among the plurality of holders and that is not allocated to the first divided area is not being used, the controller is configured to control the robot to hold the another workpiece in the first divided area using the second holder.

3. The robot system according to claim 1,
   wherein the plurality of holders are parallel to each other relative to a robot hand of the robot, and
   wherein when the robot holds the at least one workpiece, the controller is configured to control the robot to take a basic posture in which the robot hand is positioned above the conveyor with the plurality of holders aligned in a direction parallel to the width direction of the conveyor.

4. The robot system according to claim 3, wherein when the robot is in the basic posture, the allocator is configured to allocate one holder among the plurality of holders to one divided area among the plurality of divided areas that is closest to the one holder.

5. The robot system according to claim 2,
   wherein the plurality of holders are parallel to each other relative to a robot hand of the robot, and
   wherein when the robot holds the at least one workpiece, the controller is configured to control the robot to take a basic posture in which the robot hand is positioned above the conveyor with the plurality of holders aligned in a direction parallel to the width direction of the conveyor.

6. The robot system according to claim 5, wherein when the robot is in the basic posture, the allocator is configured to allocate one holder among the plurality of holders to one divided area among the plurality of divided areas that is closest to the one holder.

7. The robot system according to claim 1,
   wherein the plurality of divided areas are imaginary areas on the conveyor in the width direction of the conveyor.

8. A robot system comprising:
   a conveyor configured to convey at least one workpiece;
   a robot comprising a plurality of holders configured to hold the at least one workpiece; and
   a controller configured to control the robot to hold the at least one workpiece conveyed on the conveyor and transfer the at least one workpiece to a predetermined place using at least one holder among the plurality of holders, the controller comprising:
      a divided area setter configured to set a plurality of divided areas on the conveyor in a width direction of the conveyor, and configured to store the plurality of divided areas in a storage; and
      an allocator configured to allocate the plurality of holders respectively to the plurality of divided areas so as to hold the at least one workpiece when the at least one workpiece is conveyed in the plurality of divided areas,
   wherein the divided area setter sets the plurality of divided areas on the conveyor in the width direction of the conveyor based on divided area setting information including positions and dimensions of a movable area of the robot, the width of the conveyor, and a number of holders of the plurality of holders.

9. The robot system according to claim 8, wherein the allocator is configured to allocate one holder among the plurality of holders respectively to each one divided area among the plurality of divided areas that is closest to the one holder.

* * * * *